Patented Feb. 7, 1950

2,496,621

UNITED STATES PATENT OFFICE 2,496,621

CATALYTIC HYDRATION OF OLEFINS

Roland F. Deery, Los Angeles, Calif.; now by judicial change of name Roland Frank Deering, assignor to Union Oil Company of California, Los Angeles, Calif., a corporation of California No Drawing. Application April 30, 1945,
Serial No. 591,238

4 Claims. (Cl. 260—641)

This invention relates to a catalyst which finds use principally in the hydration of unsaturated hydrocarbons. More particularly the invention pertains to a new and novel manner of preparing catalysts for these processes which results in a catalyst possessing physical qualifications superior to the catalysts heretofore employed in such processes.

Phosphoric acid or metal salts of phosphoric acid have found widespread usage in catalysts for the hydration of olefins. The essential ingredient of the solid catalysts employed in these reactions is phosphoric acid which in a majority of cases constitutes 80% or more of the catalyst mixture. Of the various forms of phosphoric acid, orthophosphoric acid ($H_3PO_4$) is preferred for catalysts to be employed in the hydration of olefins. The particular form of phosphoric acid resulting in the finished catalyst is a function of the temperature at which the finished catalyst is dried. The progressive dehydration of one or more molecules of orthophosphoric acid will result in the formation of pyrophosphoric acid and subsequently the pyrophosphoric acid may be dehydrated to the tetraphosphoric acid which in turn may be dehydrated to the metaphosphoric acid. For this reason the temperature at which the catalyst preparations, according to this invention, are dried is held within fairly definite limits in order to insure the presence of the desired form of the acid on the catalyst.

The conventional method of preparing a phosphoric acid catalyst comprises mixing the liquid acid such as orthophosphoric acid with a powdered adsorbent material thereby forming a thick paste which is subsequently dried. The catalyst may be formed by extrusion of the paste before drying by crushing and grading the dried mass, by pilling the powdered dried mass or the like. In this type of preparation the physical strength of the catalyst is dependent to a large extent upon the phosphoric acid in the mixture. Adsorbent materials normally employed in the preparation of these catalysts comprise predominately siliceous matter such as diatomaceous earth, kieselguhr, artificially prepared silica gel and the like. A catalyst prepared in this manner is dried at a temperature controlled so as to give in the final composition the particular form of phosphoric acid desired.

Such catalysts possess in the absence of water vapor sufficient physical strength to withstand continued usage. However, due to the hygroscopic nature of phosphoric acid and due further to the dependence of the catalyst structure on the phosphoric acid, physical degradation of the catalyst occurs when in contact with water vapor. This disadvantage is particularly evidenced in the case of hydration catalysts due to the presence in the feed to the hydration reaction of considerable quantities of steam.

Generally it is the object of the present invention to provide a new and novel method of preparing solid catalysts comprising phosphoric acid, metal phosphates or a combination of the metal phosphates and a phosphoric acid with an adsorbent supporting material.

It is another object of the invention to improve the art of hydration, by preparing catalysts which exhibit superior mechanical strength to those heretofore employed.

More specifically it is the object of my invention to provide a method for preparing phosphoric acid containing solid catalysts which possess higher mechanical strength and particularly higher resistance to loss of mechanical strength in the presence of moisture than the solid phosphoric acid catalysts heretofore employed.

Other objects and advantages of my invention will become apparent to those skilled in the art as the description thereof proceeds.

Generally the catalyst preparation method according to my invention comprises precalcining an adsorbent siliceous material such as diatomaceous earth, kieselguhr, artificially prepared silica gels and the like to very high temperatures, for example, in the range of about 800° C. to about 1400° C. to impart thereto a high degree of mechanical strength independent of other constituents in the catalyst. The calcination may range from 1 to 20 hours or more in length but I have found that best results are obtained in the range of about 3 to about 10 hours. This precalcined support is subsequently impregnated with phosphoric acid, conveniently orthophosphoric acid by soaking the support in a solution of the acid having a concentration of 10 to 100% ($H_3PO_4$), or the acid may even contain free phosphorus pentoxide ($P_2O_5$). This impregnation is preferably carried out at room temperature although temperatures as high as 100° C. or higher may be employed.

The impregnated catalyst is subsequently dried at a temperature chosen on the basis of the desired form of the acid in the final composition. In the preparation of a hydration catalyst the drying temperature will be maintained below about 240° C. such as from about 105° C. to about 240° C. so as to prevent a conversion of the orthophosphoric acid to pyrophosphoric acid.

Although the ortho form is preferred for hydration reactions, it is to be understood that any or all of the various forms of phosphoric acids may be employed in the catalyst preparation and may occur in the final composition without departing from the essential elements of my invention. The catalysts may be dried at the desired temperatures for a period of from about 1 to about 20 hours or longer, but I have found that the optimum time of drying is between about 4 and about 8 hours.

A catalyst prepared in the above described manner, by imparting to the supporting material a physical structure independent of phosphoric acid, not only possesses a high initial mechanical strength but contrary to the presently employed solid phosphoric acid catalysts exhibits no softening or other mechanical breakdown when exposed to as high as 60% water vapor in the hydrocarbon feed.

It is preferable to use phosphoric acid itself for the impregnation of these siliceous supports, but the salts of this acid may also be used provided an excess of the acid is present. If salts are employed in this manner, those of the metals of the first, second and third "transitional" groups are preferred. These transitional groups include those elements having electronic structures such that the differentiating electron is in the second from the outermost shell; that is, the outermost shell remains substantially unchanged with two electrons, while the second from the outermost shell is being built up from eight to eighteen electrons. The metals of the first transitional group are those having atomic numbers between 21 and 30 and include scandium, titanium, vanadium, chromium, manganese, iron, cobalt, nickel, copper and zinc. Those of the second transitional group have atomic numbers between 39 and 48 and include yttrium, zirconium, columbium, molybdenum, masurium, ruthenium, rhodium, palladium, silver and cadmium. Those of the third transitional group have atomic numbers 57 and 72 to 80 and include lanthanum, hafnium, tantalum, tungsten, radium, osmium, iridium, platinum, gold and mercury. In impregnating the supports with phosphoric acid and the above metallic salts, the support may be immersed first in an aqueous solution of orthophosphoric acid; then the material thus impregnated is further impregnated with an aqueous solution of a soluble salt such as the chloride or nitrate of the desired metal or metals. The impregnations may also be carried out in the reverse order. The solid material may be dried between the impregnations if desired, and additional impregnations may also be employed to obtain the desired amounts of salts and acid. Such intermediate drying may also be carried out at temperatures from about 105° C. to about 300° C. for periods of from 1 to 20 hours or longer.

The above catalysts are suitable for the hydration of any olefin but are particularly suitable for the hydration of the normally gaseous olefins such as ethylene, propylene and the butenes. These may be employed in mixtures such as are found in gases produced in cracking operations, for example, or other mixtures. Suitable operating conditions for the hydration of the above olefins lie within temperature ranges of about 150° C. to about 350° C., preferably about 175° C. to 300° C.; pressures between about 1 and 200 atmospheres, preferably above 10 atmospheres; and contact times between about 1 second and 10 minutes. Steam must be employed, and the proportion of steam to olefin should be between about 15% and about 75%. The general effects of these reaction conditions are as follows: The lower temperatures, the higher pressures, and the higher steam ratios increase the degree of hydration; the higher temperatures reduce the contact time required; and the higher proportions of steam increase the total condensate obtainable from the product gas while decreasing the concentration of alcohol in the condensate. The conditions of temperature, pressure and concentration are so adjusted as to insure the maintenance of the vapor phase reaction. It is possible to conduct the operation in the liquid phase also but it is preferable to employ the vapor phase. When propylene is hydrated, the temperature conditions are preferably somewhat lower than for ethylene, a maximum of about 250° C. being preferable. Slightly lower maximum temperatures are preferred for the higher olefins.

As an example of the hydration of propylene, a diatomaceous earth-phosphoric acid catalyst prepared as in the above example (using about 80% orthophosphoric acid solution for the impregnation) and having an acidity corresponding to about 40% orthophosphoric acid, was employed in an operation similar to the above hydration operation at a temperature of about 180° C. and a pressure of about 250 pounds per square inch gage. The hydrocarbon feedstock consisted of about 90 to 95% propylene and 5 to 10% propane, and the gaseous stream passed over the catalyst consisted of about 82% of this hydrocarbon feed and 18% steam. The isopropyl alcohol recovered by condensing the condensibles in the product and separating the water by distillation, amounted to 4.0% of the propylene in the feed, which represents about 90% of the equilibrium value. The operation was continued for about 100 hours without appreciable loss in activity of the catalyst.

Variations in the process of recovery of reaction products such as the use of azeotropic distillation, solvent extraction and the like, recycling of the unreacted gas, use of moving bed or fluid catalyst contacting systems, and other variations which would occur to one skilled in the art to be included in the scope of the invention as defined in the following claims.

I claim:

1. A process for hydrating olefins which comprises contacting said olefins in the presence of about 15% to 75% of water vapor with a hydration catalyst comprising a silica support upon which is distended a catalytic agent of the group consisting of at least one of the oxygen containing acids of phosphorus and mixtures of the oxygen containing acids and metal salts of phosphorus in which mixtures the acids are in excess, said catalyst having been prepared by precalcining the silica support to a temperature between about 800° C. and about 1400° C. for a time sufficient to impart physical strength thereto independent of other constituents of the catalyst, impregnating said support with said catalytic agent, and drying the impregnated support at a temperature not greater than about 240° C.

2. A process for the hydration of olefins which comprises contacting said olefins in the presence of about 15% to 75% of water vapor at a temperature between about 150° C. and 300° C. and superatmospheric pressure with a catalyst comprising a silica support upon which is distended an acid of phosphorus which catalyst is prepared by precalcining said silica support to a temperature in the range of about 800° C. to about 1400° C., impregnating said calcined silica support with an acid of phosphorus, and drying the impregnated support at a temperature in the range of about 105° C. to about 240° C.

3. A process for the hydration of normally gaseous olefins which comprises contacting said olefins in the presence of about 15% to 75% of water vapor at a temperature between about 150° C. and 300° C. and superatmospheric pressure with a catalyst comprising a major proportion of diatomaceous earth upon which is distended orthophosphoric acid, said catalyst having been prepared by calcining said diatomaceous earth to a temperature between about 800° C. and about 1400° C. for a time between about one hour and twenty hours, and impregnating the so calcined diatomaceous earth with an aqueous solution of said orthophosphoric acid, and drying the impregnated support at a temperature between about 105° C. and about 240° C.

4. A process according to claim 3 in which the olefin is propylene.

ROLAND F. DEERY.

REFERENCES CITED

The following references are of record in the file of this patent:

UNITED STATES PATENTS

| Number | Name | Date |
| --- | --- | --- |
| 1,977,632 | Horsley | Oct. 23, 1934 |
| 1,977,635 | Horsley | Oct. 23, 1934 |
| 1,999,620 | Peski | Aug. 30, 1935 |
| 2,112,793 | Muggleton et al. | Mar. 29, 1938 |
| 2,120,723 | Watson | June 14, 1938 |
| 2,161,984 | Sweeney et al. | June 13, 1939 |
| 2,171,207 | Boultbee | Aug. 29, 1939 |
| 2,173,376 | Rose | Sept. 19, 1939 |
| 2,300,123 | Keunecke et al. | Oct. 27, 1942 |